United States Patent [19]
Shiraishi

[11] Patent Number: 5,090,931
[45] Date of Patent: Feb. 25, 1992

[54] METHOD OF PRODUCING A LAMP HAVING A COATED LAYER AND THE LAMP PRODUCED THEREBY

[75] Inventor: Isao Shiraishi, Yokosuka, Japan

[73] Assignee: Toshiba Lighting & Technology Corporation, Tokyo, Japan

[21] Appl. No.: 620,405

[22] Filed: Nov. 29, 1990

[30] Foreign Application Priority Data

Nov. 29, 1989 [JP] Japan .................. 1-310250

[51] Int. Cl.$^5$ .......................... H01J 9/26; H01J 9/38
[52] U.S. Cl. .......................... 445/22; 445/26; 445/58
[58] Field of Search ............... 445/22, 26, 58

[56] References Cited

U.S. PATENT DOCUMENTS

| | | | |
|---|---|---|---|
| 3,514,276 | 5/1970 | Fujio et al. ............... | 445/58 |
| 4,545,774 | 10/1985 | Van Gils et al. ............ | 445/22 |

FOREIGN PATENT DOCUMENTS

| | | | |
|---|---|---|---|
| 62-281227 | 12/1987 | Japan ............... | 445/26 |
| 62-281229 | 12/1987 | Japan . | |
| 62-287545 | 12/1987 | Japan . | |
| 63-13233 | 1/1988 | Japan . | |
| 64-72443 | 3/1989 | Japan ............... | 445/26 |
| 1-117236 | 5/1989 | Japan ............... | 445/22 |
| 1193885 | 6/1970 | United Kingdom ... | 445/58 |

Primary Examiner—Kurt Rowan
Assistant Examiner—Jeffrey T. Knapp
Attorney, Agent, or Firm—Foley & Lardner

[57] ABSTRACT

A method of producing a lamp having a coated layer and of a type in which linear tubes in parallel are interconnected, comprises the steps of forming a connected glass tube by making an airtight connection via connecting portions between side walls of a plural number of glass tubes having openings at both ends and main portions that are linear and arranged parallel to each other; of forming a coated layer on the inner wall surface of the connected tube including the connecting portions by introducing a coated substance from opening end portions of the connected glass tube; and of forming an airtight path as a discharge path in the connected tube including the main and connecting portions by sealing the opening end portions on a side of the connecting portions of the connected tube after the formation of the coated layer.

16 Claims, 7 Drawing Sheets

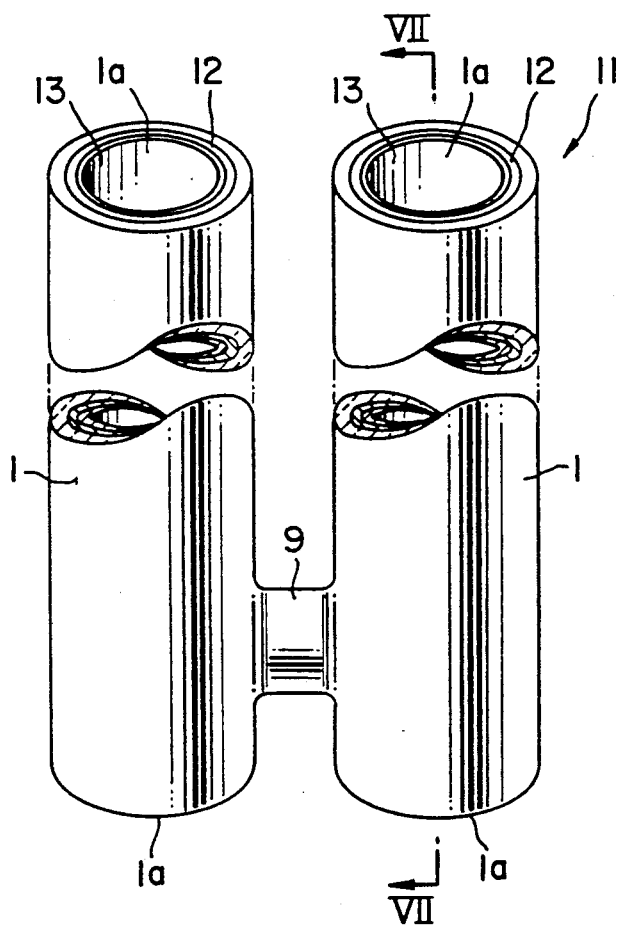
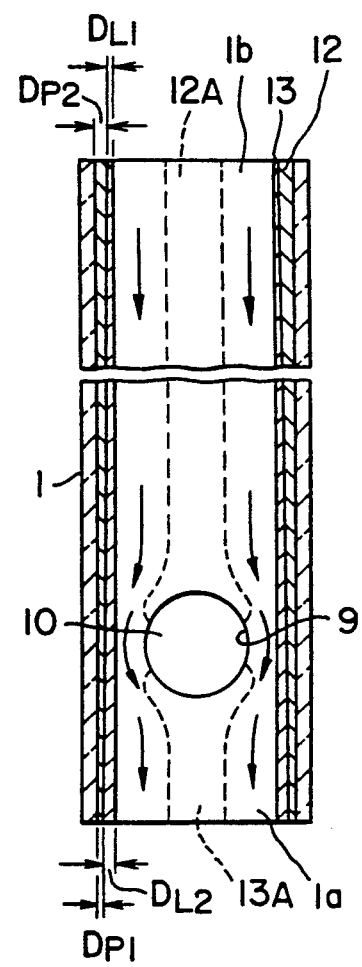
FIG. 7A
FIG. 7B

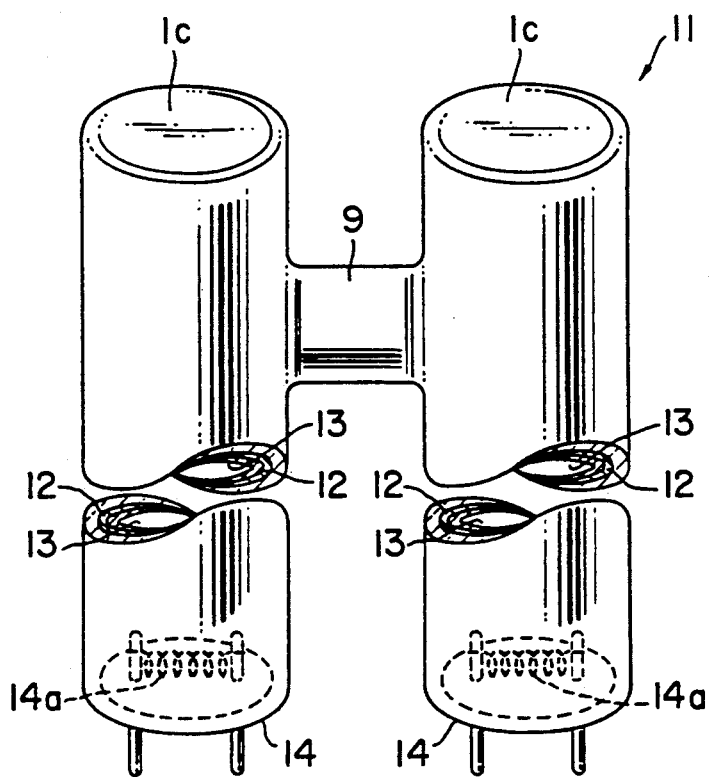
F I G. 10
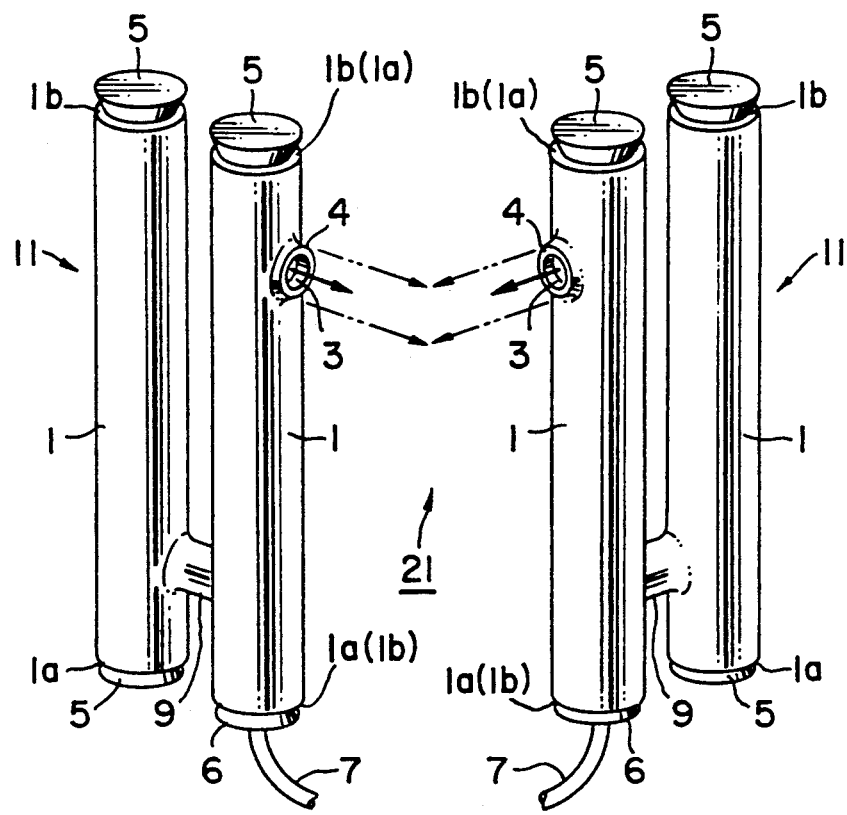
F I G. 11

METHOD OF PRODUCING A LAMP HAVING A COATED LAYER AND THE LAMP PRODUCED THEREBY

BACKGROUND OF THE INVENTION

The present invention relates to a method of producing a lamp having a coated layer such as a fluorescent lamp with a plural number of glass element tubes having openings at both ends and connected at the side of the openings to form a single discharge path, and more particularly to a method of producing a lamp in which an internal portion of a connecting portion cannot be seen and in which the connecting portion also emits light in the same manner as the other portions of the glass tube.

In recent years, linear glass element tubes having either two or four openings at each end have been connected in the vicinity of these openings to form so-called compact fluorescent lamps that form discharge paths that are bent into either an H-shape or a double H-shape.

The following are known as methods of producing such compact fluorescent lamps.

A fluorescent lamp having such a shape and structure is manufactured using technology such as that for "METHOD OF PRODUCING A LOW-PRESSURE MERCURY VAPOR DISCHARGE LAMP" as described in U.S. Pat. No. 4,324,447 (hereinafter cited as Wolf et al.).

As is clear from referral to Wolf et al., after several fluorescent tubes have been manufactured, had one end closed and a luminescent agent coated to their inner walls, the gas fusion method is used to introduce a gas flow via a discharge tube and at the same time fuse the glass element tubes so that an aperture is formed between adjacent tubes.

However, according to such a method, the gas tubes are fused after the luminescent layer has been formed and so it is easy for the luminescent substance to enter into the connecting portion and produce cracks. In addition, when the luminescent substance on the inside walls of the connecting portion is cleaned, it is difficult to do so unless the diameter of the connecting portion is large. This is because the particles of the luminescent substance are sized in the order of several microns in the case of a luminescent layer and so unless the diameter is made large, it is not possible to connect the tubes without removing the luminescent layer. Accordingly, it is possible to perform coating of a protective layer of aluminum or titanium particles that have particle diameters in the sub-micron order, and this creates a problem for the application of this method to fluorescent tubes of the type where a protective layer is provided. The following prior art has been proposed in order to overcome this problem.

(A) A method to form an opening for tube connection without causing cracks or breakages by attaching a phosphor-coating adherence preventing member in the vicinity of an open end of a glass element tube, and by removing the preventing member after application of a phosphor screen to the tube inner surface (refer to Japanese patent application Laid-Open Publication No. 62-287545 (1987)).

(B) A method to apply a phosphor-coating layer to the inside wall of a glass element tube and to form a luminescent layer by baking after drying, and then removing the phosphor coating layer on the glass tube in the vicinity of their open ends, sealing the tubes at these parts and also providing a through hole on the side of the tube so as to join the plural number of tubes (refer to Japanese Patent Application Laid-Open Publication No. 63-13233 (1988)).

(C) A method to form a phosphor coating layer in the same manner to the inside wall of a glass element tube, closing the openings with the luminescent layer still attached and then connecting the portions of the glass element tubes where they are to be connected (See Japanese patent application Laid-Open Publication No. 62-281229 (1987)).

However, there are the following problems with these conventional technologies.

With method (A) of J.P. No. 62-287545, it is necessary to have a coating prevention layer, and the labor involved in attaching and removing this cannot be ignored as the production processes become complex and an increased price is unavoidable.

With method (B) of J.P. No. 63-13233, it is necessary to have the tools and the labor to partially remove the luminescent layer and this complicates the production processes and also inhibits mass production. In particular, when a protection layer of aluminum particles or the like is provided using the luminescent layer as the base, it is necessary to use much labor and special tools such as wire brushes as the removal of the protection layer is difficult.

With method (C) of J.P. No. 62-281229, the portion of the tube where the connection is to be made is connected by blowing out the tubes while the luminescent layer is in place and so the luminescent layer is drawn out when the glass at the connecting portion is made pliant and connected, and so the thickness of the luminescent layer on the inside wall of the connecting portion becomes thinner, and the amount of light emitted is consequently less so that there is an uneven brightness distribution which is not desirable for the external appearance.

Accordingly, fluorescent lamps produced by the above conventional methods are not desirable as they have the problems of reliability, performance and maintenance of the external appearance.

SUMMARY OF THE INVENTION

A primary object of the present invention is to provide a method of producing an effective fluorescent lamp which is simple, inexpensive, and which does not involve the use of special tools or require complex procedures.

In addition, a secondary object of the present invention is to provide a fluorescent lamp that eliminates the discontinuity in the brightness and the external appearance when the luminescent layer is also provided on the inner surface of the connecting portion, and in which the internal portion of the tube portion cannot be seen and in which there is no difference in the degree of brightness when light is emitted from the connecting portion.

In order to attain the above objects, the fluorescent lamp producing method according to the present invention comprises a step of forming a plural number of glass element tubes that have both of their ends open as opening portions, a step of sealing the opening portions of the glass tubes by melting the glass at required portions on the side walls in the vicinity of one end portion and forming a complex glass tube that is connected in an airtight manner, a step of introducing a substance from an open portion of the complex tube so as to form a coated layer on the inner wall surface of the tube, and a step of closing the open portions of the complex tube at the side of the connecting portion so as to form a discharge path.

The present invention eliminates the problem described above by using a plural number of glass tubes that have openings at both of their ends, and for example, blowing out the respective portions at which a connecting portion is to be formed, forming a coated layer such as a luminescent layer on the inner surface of the connected tube, and then closing the openings in the vicinity of the connecting portions. More specifically, the steps are greatly reduced. If the luminescent layer is formed after connecting the tubes in this manner, then the luminescent layer is formed on the inner wall surface of the connecting portion to a thickness which is approximately uniform to that of the other portions. In addition, the same also applies when a protection layer is applied prior to the formation of the fluorescent layer.

In this manner, as the method of producing a fluorescent lamp according to the present invention comprises the step of connecting the glass element tubes to form the complex tube by blowing out connecting portions thereof, a step of forming a coated layer on the inner surface of the tube, and a step of closing the opening portions of the complex tube, there is no difference between the degree of brightness of the connecting portion and that of the other portions of the tube, the connecting portion also emits light, and the external appearance is satisfactory.

BRIEF DESCRIPTION OF THE DRAWINGS

In the accompanying drawings:

FIGS. 6A, 6B, 7A and 7B are sectional views and partial views respectively showing steps of forming the protection and luminescent layers according to a second embodiment of the present invention;

FIG. 10 is a partial perspective view showing a fluorescent lamp of a linear tube connection type and produced by the method according to the first or second embodiment of the present invention;

FIG. 11 is a perspective view showing a step of forming a blown out portion in the manufacture of a fluorescent lamp of the four linear tube type, according to a third embodiment of the present invention;

DETAILED DESCRIPTION OF THE PREFERRED EMBODIMENTS

Figure 1:
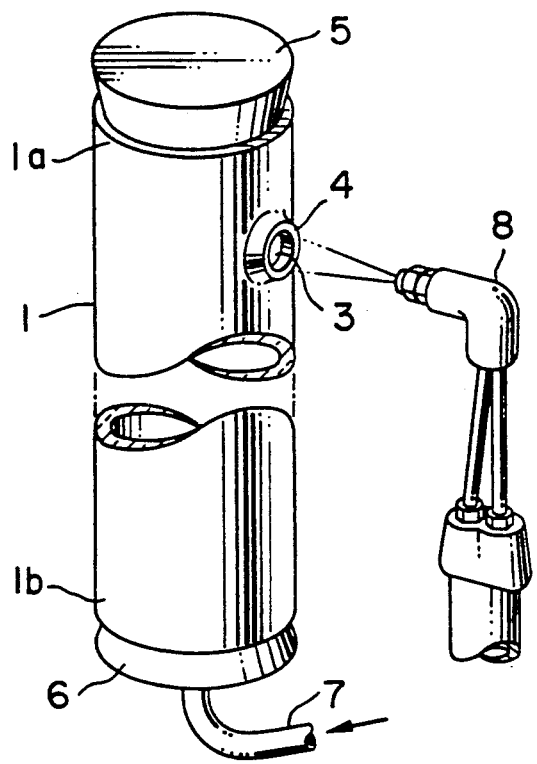
FIG. 1 is an outline perspective view showing a step of forming a connecting portion of an element glass tube for describing a method of producing a fluorescent lamp according to a first embodiment of the present invention.
Figure 2:
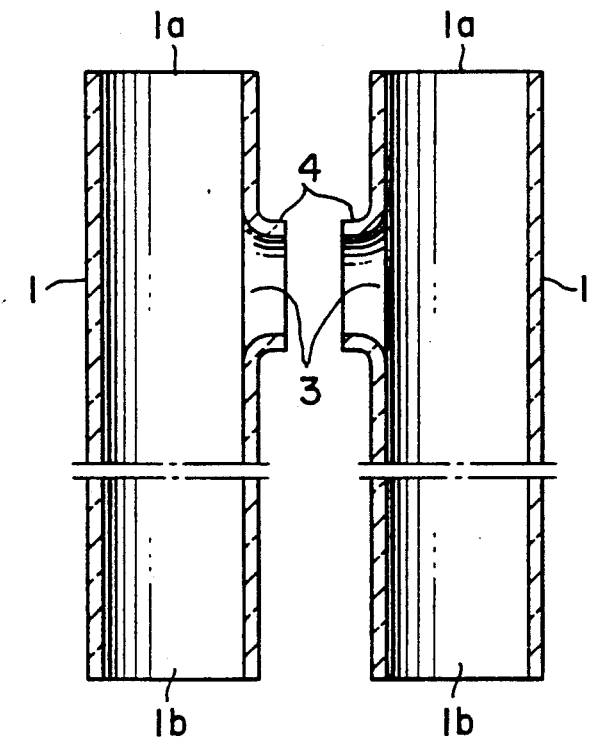
FIG. 2 is a sectional view showing a step of connecting portions where a connection is to be made according to the first embodiment of the present invention.

The following is a description of a first embodiment of the present invention with reference to FIGS. 1-5 and 8-10. As shown in FIGS. 1 and 2, a linear glass tube having openings at both ends is formed with blown-out portions 4 and 4 by heating portions 3 and 3 for connection in the vicinity of one of the openings 1a and 1a and blowing them out towards the outside.

As shown in FIG. 1, the blown-out portion 4 is formed as follows. The two ends 1a and 1b of the linear glass tube 1 of a cylindrical shape have rubber stoppers 5 and 6 inserted into them and are closed. The rubber stopper 6 has a pipe 7 for introducing a special gas into the linear elemental tube 1. After these preparations have been made, the portion 3 for connection at the end closest to the opening portion 1a is heated by a gas burner and at the same time, gas is blown into the tube 1 via the pipe 7. The glass at the portion 3 for connection which has been heated by the burner 8 is made pliable by the heat so the pressure of the gas applied uniformly to the inside of the glass tube 1 blows out this pliant portion to form the blown-out portion 4.

Then, as shown in FIG. 2, the two tubes 1 and 1 in which the blown-out portions 4 and 4 have been formed are placed so that the blown-out portions 4 and 4 correspond and are connected.

Figure 3:
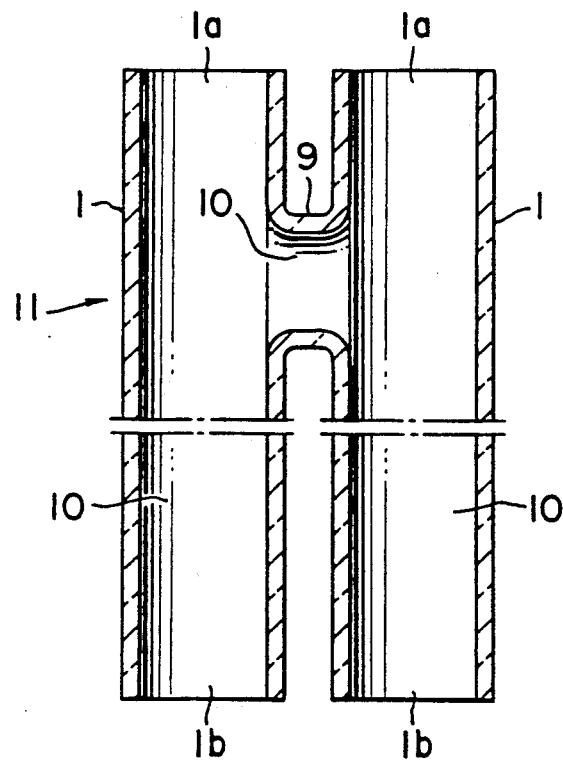
FIG. 3 is a sectional view showing the step of connecting the glass tube according to the first embodiment of the present invention.

Then, as shown in FIG. 3, the blown-out portions 4 and 4 of both of the tubes 1 and 1 are heated and made pliant and fused together to form the connecting portion 9 and so form an H-shaped tube 11 that has a single, continuous discharge path 10. The tube 11 that is connected into an H-shaped tube in this manner can have gas blowing into it via the pipe 7 while the four end portions have the rubber stoppers 5 and 6 inserted into them and the connecting portion 9 shown in FIG. 3 is heated and annealed so that the diameter of the connection can be made to a required size.

Figure 4:
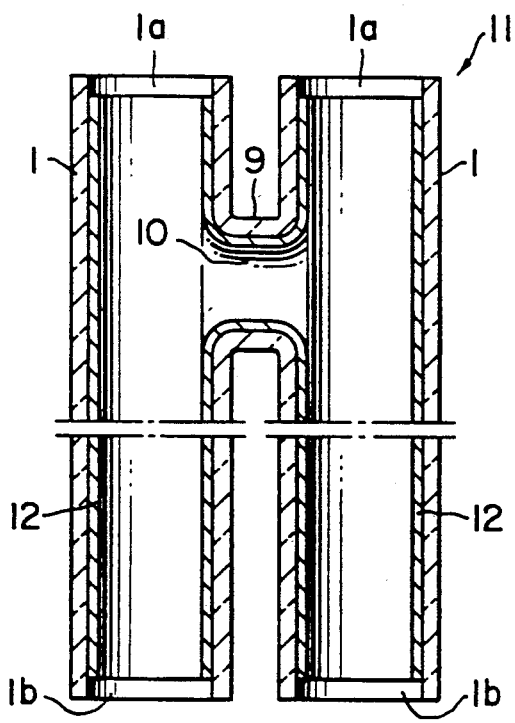
FIG. 4 is a sectional view showing a step of forming a protecting layer according to the first embodiment of the present invention.

Then, as shown in FIG. 4, aluminum powder or titanium powder or some other organic solvent suspension liquid is applied to the inner surface of the connected H-shaped tube 11 and a protection layer 12 formed. The protection layer 12 is also formed on the inner surface of the connecting portion 9. However, the vicinity of both of the openings 1a and 1b is avoided when this layer is applied.

Figure 5:
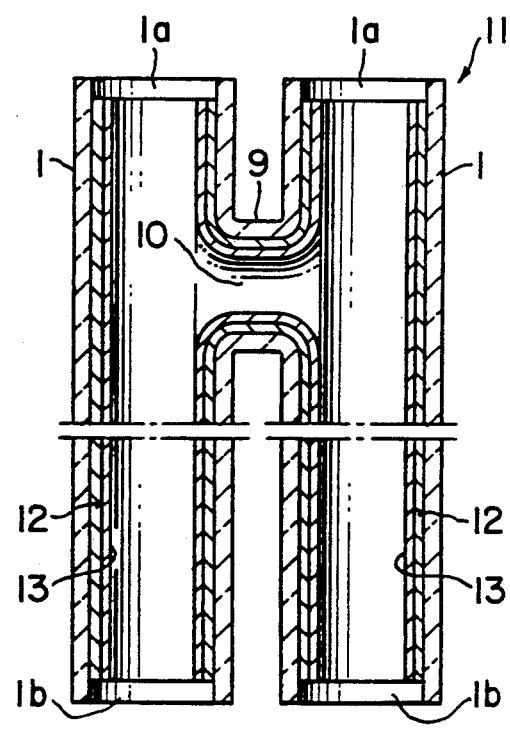
FIG. 5 is a sectional view showing a step of forming a luminescent layer according to the first embodiment of the present invention.
Figure 6A:
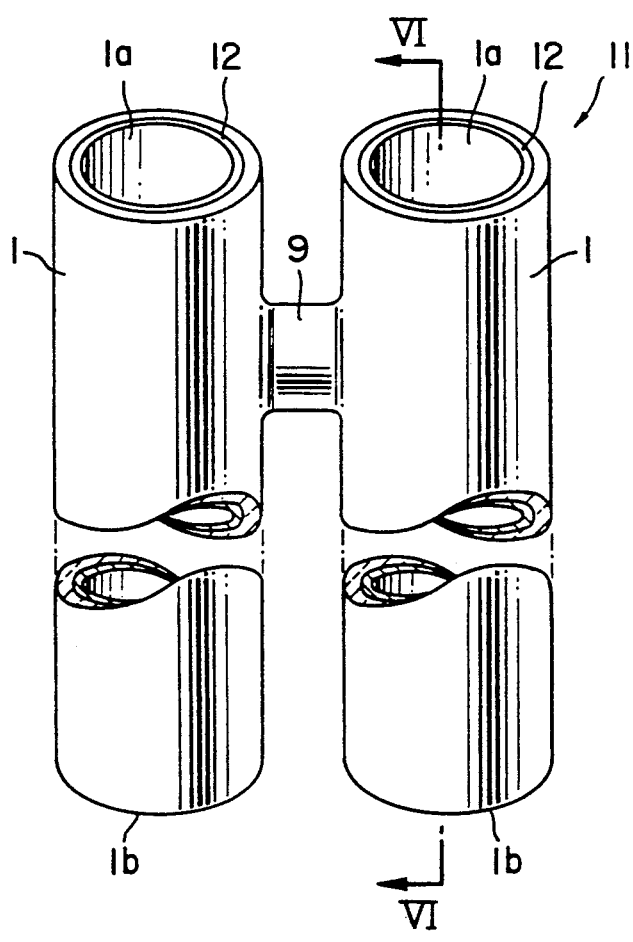
Figure 6B:
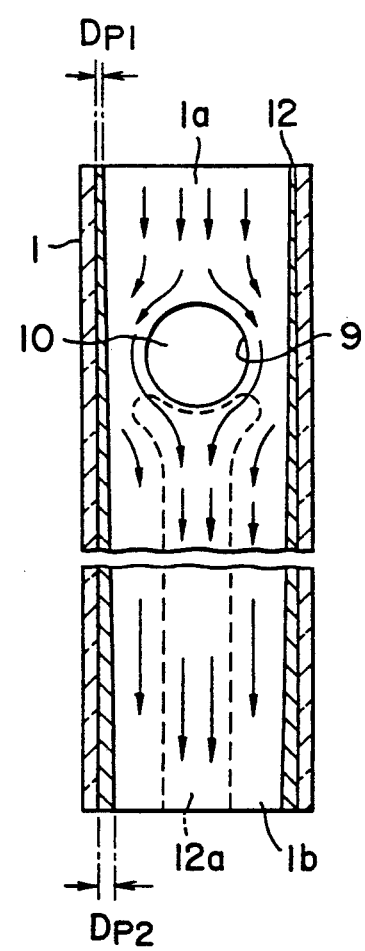

Then, as shown in FIG. 5, a phosphor suspension is applied to the surface of the protection layer on the inner surface of the tube 11 to form a luminescent layer 13 as a thick fluorescent film. When this is done, it is necessary to perform application of the luminescent layer 13 after the protection layer 12 has been applied and baked or else the protection layer 12 and the luminescent layer 13 will dissolve into each other. Conversely, if both the layers have not been dissolved into each other and can be thickly applied to a predetermined thickness without an unevenness, there can be a single baking after both the layers have been applied one over the other.

In the first embodiment described above, the protection layer 12 and the luminescent layer 13 are not limited to the direction of application or the like, but in the method of producing a fluorescent lamp according to a second embodiment of the present invention shown in FIGS. 6A, 6B, 7A and 7B, the directions of application of the layers are not the same.

More specifically, in the step of applying the layers, the application of the protection layer 12 is such that an organic suspension of aluminum powder, titanium powder, or zinc powder is allowed to flow in from the side of the opening portion 1a of the connecting portion 9. If this is done, then the suspension liquid is drawn into an arc that flows in the direction of the arrow shown in FIG. 6B. The liquid flows from the top to the bottom and so the layer thickness $D_{P1}$ on the side of the opening portion 1a is thinner than the layer thickness $D_{P2}$ at the side of the opening portion 1b and the liquid at the central portion of the connecting portion 9 flows around slightly so that the lower side of the connecting portion 9 has the protection layer 12 formed slightly thicker by the portion of an area 12A shown in FIG. 6B. There is little that can be done about the formation of these two types of application patterns, but when the luminescent suspension is allowed to flow from the side of the opening portion 1a, the inside wall surface of the glass tube 1 becomes status where the thickness of the layer approaches that of the side of the opening portion 1b. In order to prevent this, in the step of applying the layers in the method according to the second embodiment, when the luminescent layer 13 is applied, the tube 11 is inverted and the thickness $D_{L2}$ of the luminescent layer 13 on the side of the opening portion 1a becomes "$D_{P1}+D_{L2}$" and so the diameter of the discharge path 10 inside the glass tube 11 is uniform because "$D_{P1}+D_{L2}$" is approximately equal to "$D_{P2}+D_{L1}$". In addition, application unevenness of the luminescent layer 13 is formed in an area 13A shown in FIG. 7B on the side of the opening portion 1a of the connecting portion 9 but the area 12A of the protection layer 12 spans the central portion of the connecting portion 9 and so the sides are opposite and there is not a thick portion on only one side.

The later steps are the same for both the first embodiment and the second embodiment and so the description is the same as that for the first embodiment.

Figure 8:
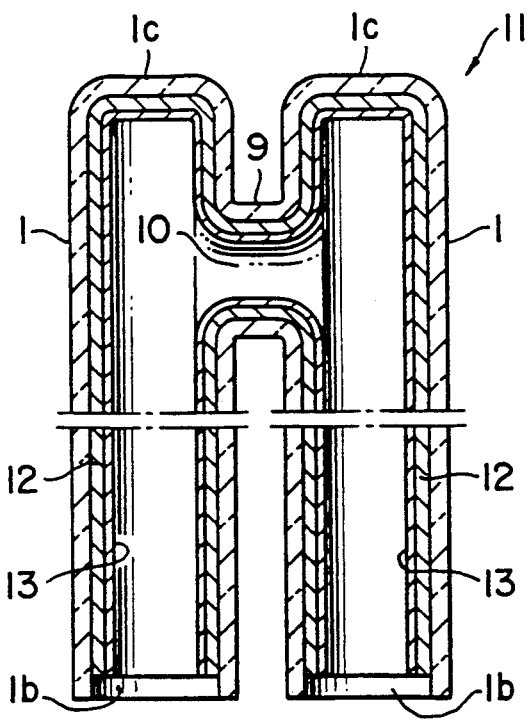
FIG. 8 is a sectional view showing a step of closing the opening portions on the side of the connecting portion according to the first embodiment of the present invention.

As shown in FIG. 8, the openings 1a and 1a on the side of the connecting portion 9 are blown out and closed to form closed ends 1c. When this is done, either one portion or the entire inner surface closed ends 1c and 1c have the luminescent layer 13 remaining in the status where it is laminated on the protection layer 12 base.

Figure 9:
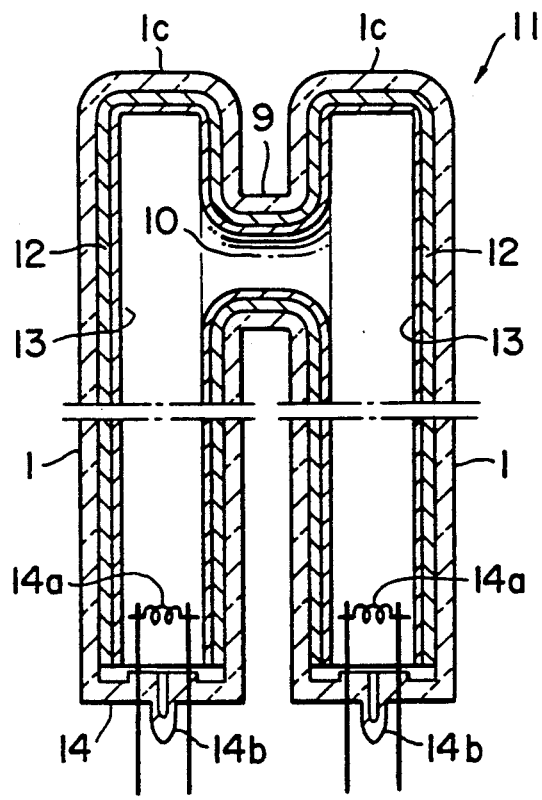
FIG. 9 is a sectional view showing a step of closing the opening portions on the other side according to the first embodiment of the present invention.

Finally, as shown in FIG. 9, in to the other ends 1b and 1b of the tube 11 are inserted stems 14 and 14 to which filaments 14a and 14a are mounted and the air is exhausted through the air exhaust tubes 14b and 14b and the starting gas and mercury (or amalgam) introduced and the air exhaust tubes 14b and 14b sealed.

As described above, since the method according to the first and second embodiments comprises the step of forming the luminescent layer 13 on the protection layer 12 as the base on the inner surface of the H-shaped tube 11 after the glass element tubes 1 and 1 have been connected to form the tube 11, these embodiments have as advantages that the protection and luminescent layers 12 and 13 are formed to the same thickness for the inner surface of the connecting portion 9 and for the other portions, the inside of the tubes 1 and 1 cannot be seen from the connecting portion 9, when lit, light is also emitted from the connecting portion 9, and the degree of brightness is uniform and external appearance consequently good. In addition, there is no embedding of component particles of the protection layer 12 and the luminescent layer 13 to the glass of the connecting portion 9 and so there is also the advantage of a high connection strength. Furthermore, the luminescent layer 13 is also formed on top of the protection layer 12 on the inner surface of the closed ends 1c and the inside of the glass tube 11 cannot be seen from the closed ends 1c, and these portions also emit light when lit so that the external appearance is also good. Also, no external force is applied to the closed ends 1c and so component particles of the protection layer 12 and the luminescent layer 13 are not embedded into the glass so that there is no deterioration of the strength and no reduction in the product value.

Moreover, the glass tube is not limited to a linear glass tube in the present invention, but can be a U-shaped tube, for example, with both ends open, and linked at only one end, but there is no limit to other configurations.

Figure 12:
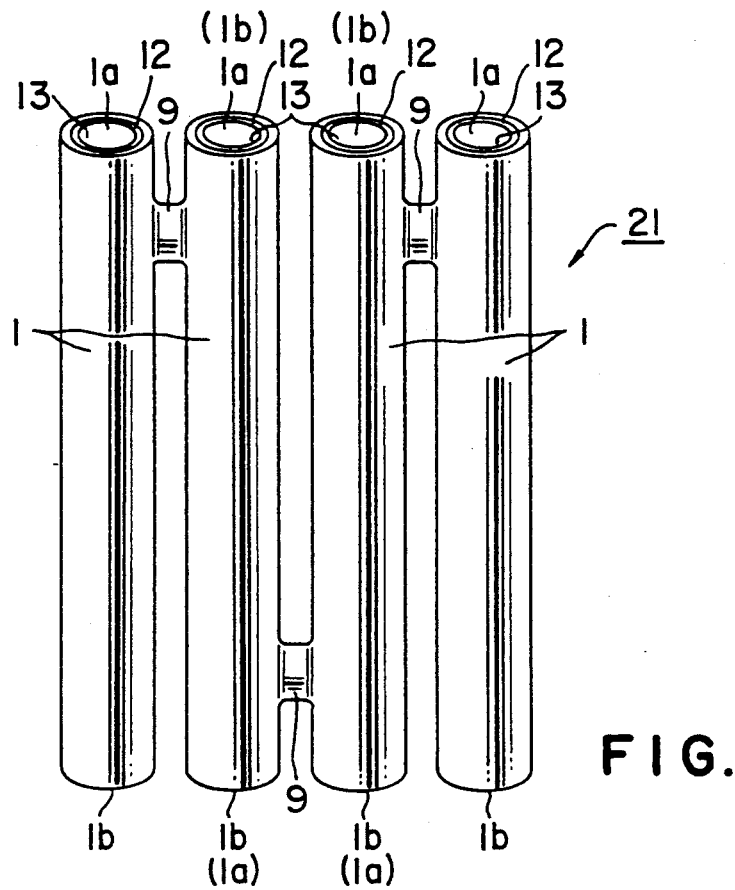
FIG. 12 is a perspective view showing a step of applying a luminescent layer and a protection layer according to the third embodiment of the present invention.

For example, as shown in FIGS. 11 and 12, four glass tubes can be connected to form two H-shaped tubes 11. This connection is performed, as shown in FIG. 11, by forming a pair of tubes 11 by the connection step described for the first embodiment, inserting rubber stoppers 5 and 5 into both of the opening portions 1a and 1b of one of the glass tubes 1, and then inserting a rubber stopper 5 into the opening portion 1a on the side of the portion 3 for connection of the other glass tube 1 and a rubber stopper 6 with a pipe 7 into the opening portion 1b of the other side. The connecting portions 9 are different as one is for the middle two tubes and the others for the outer two tubes and so opening portions 1b and b become the opening portions 1a and 1a when the two tubes are connected. FIG. 11 shows the status where the middle two tubes are connected after the outer two tubes 1 and 1 have been linked and a pair of the H-shaped tubes 11 and 11 have been formed. This connection step is the same as that for the first embodiment described in FIGS. 1 through 5 and 8 through 10 and so the description of it is omitted.

As described above, the connecting portion 9 is formed with connected tube 21 having four element tubes 1 so that their end portions are mutually different. The tube 21 then has the rubber stoppers 5 and 6 that are in the eight end portions removed and then as shown in FIG. 12, suspension liquid is applied to the inner wall surfaces via each of the opening portions and the protection and luminescent layers 12 and 13 are formed step by step. The details of this are as explained above for the first and second embodiments with reference to FIGS. 6A, 6B, 7A and 7B and so the corresponding description of them will be omitted.

Figure 13:
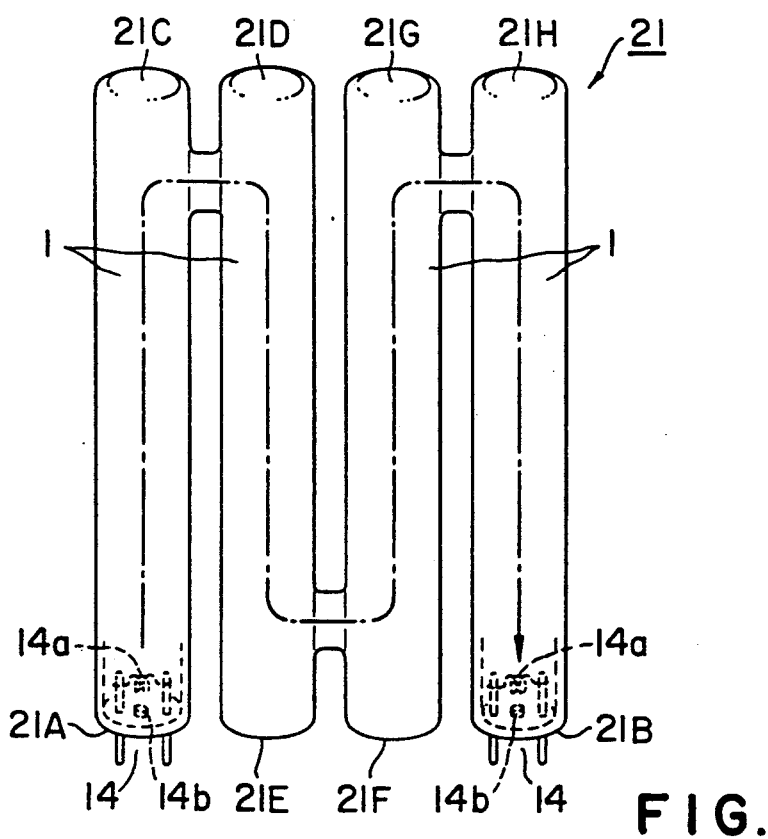
FIG. 13 is a perspective view showing a fluorescent lamp of the four tube type according to the third and fourth embodiments of the present invention.

Then, as shown in FIG. 13, the end portions 21A and 21B, to which a connecting portion 9 is not formed, are removed and the end portions 21C through 21H are heated by a burner not shown in the figures, and the glass tube melted to seal the end portion 1a. The details of this melting step are as explained above for preceding embodiments and so the corresponding description of them will be omitted. Following this, the remaining two end portions 21A and 21B are sealed in the same manner as explained above for preceding embodiments by the stems 14 and 14 having filaments 14a and 14a and the air inside is exhausted via the air exhaust tubes 14b and 14b and the starting gas and mercury (or amalgam) introduced and the air exhaust pipes 14b and 14b sealed.

Moreover, in the manufacture of a tube 21 having four connected tubes 1, the present invention is not limited to this third embodiment described above as the connection process can be that of a fourth embodiment described below.

In the fourth embodiment, each of steps described above for the first and second embodiments are used to form two H-shaped tubes 11 which are then connected to form a tube 21 having four connected element tubes 1. The H-shaped tubes used here are those at the stage prior to the fitting of the stem to both of the opening end portions. A pair of the H-shaped tubes is prepared and then the method of the prior art (B) is used to link the two H-shaped tubes by blowing out the portions for connection. In this step, the end portions in the vicinity of the portions for connection (such as the end portions 21E and 21F in the case of FIG. 13) have rubber stoppers fitted into them in the status where they are open, and the rubber stopper 6 having the pipe 7 for the introduction of gas is inserted to the opening portions 21A and 21B and gas blown in from the pipe 7 while the portions for connection are heated from the outside by a burner and connected.

A fluorescent tube having four glass element tubes as described above, has the overall shape shown in FIG. 13. A fluorescent tube manufactured in accordance with the third and fourth embodiments of the present invention has a discharge path formed as indicated by the dash and dotted line in FIG. 13 and the element tubes and the connecting portion both have the same degree of brightness and excellent external appearance.

In addition, it is not essential to have the protection layer and the luminescent layer on the inner surfaces of the closed ends as for example, when the glass element tubes are connected at the middle portion on the side of the stem, then even if the closed ends are made of element glass, these portions will be housed inside a metal fitting when the product is completed and so there is no deterioration of the product value. Furthermore, it is not essential to have a protection layer as the base because the luminescent layer can be directly applied to the inner surfaces of the glass tubes and the connecting portions.

It is to be understood that the present invention is not limited to the manufacture of fluorescent lamps having a luminescent layer, but is also applicable to other lamps such as UV lamps and the like.

What is claimed is:

1. A method of producing a lamp having a coated layer and parallel linear tubes, comprising:
    a step of forming a connected glass tube having a plural number of glass element tubes and connecting portions between side walls of said plural number of glass element tubes, each of said glass element tubes having openings at first and second ends and having linear main portions arranged parallel to each other;
    a step of forming a coated layer on an inner wall surface of said connected glass tube including said connecting portions by introducing a coating substance from said openings at said first end of said connected glass tube and by exhausting said coating substance from said openings at said second end; and
    a step of forming an airtight path as a discharge path in the connected glass tube including said main portions and said connecting portions by sealing said openings of said connected glass tube after the formation of said coating layer.

2. The method according to claim 1, wherein said step of forming said coating layer is a step of coating a luminescent substance as said coating substance to form a luminescent layer.

3. The method according to claim 1 further comprising a step of sealing a discharge gas inside said connected glass tube and of fitting electrodes to said first and second ends of said tube after the formation of said airtight path.

4. The method according to claim 1 wherein said connected glass tube has two glass element tubes connected to each other.

5. The method according to claim 1 wherein said connected glass tube has four glass element tubes connected to each other, so that said connecting portions are positioned alternately in the vicinity of said first and second ends.

6. The method according to claim 5; wherein said connected glass tube has four glass element tubes which are connected to each other so that adjacent connecting portions of said connected portions are positioned alternately at said first and second ends.

7. The method according to claim 1 wherein said step of forming said connected glass tube is a step of connecting four glass element tubes airtightly via one connecting portion for each two tubes and then connecting each pair of two tubes airtightly at a position in the vicinity of said end on said sidewall which is not an end where a connecting portion is already formed.

8. The method according to claim 1; wherein said step of forming said connected glass tube comprises
    a step of sealing first and second ends of open glass tubes, and of fitting a pipe for the insertion of gas to one glass tube;
    a step of heating a tube outer wall by a gas burner at a position for the formation of a connecting portion and melting the glass, and introducing gas via said pipe into sealed glass tubes to blow out said portion for the formation of a connecting portion;
    a step of bringing both blown out portions in the status where adjacent tubes are at a predetermined distance so as to form said connecting portion; and
    a step of expanding said connecting portions of each glass element tube by continuing to heat from outside by a gas burner at said connecting portions to a required diameter.

9. The method according to claim 1; wherein said step of coating said coated layer comprises
    a step of forming a protection layer on an inner wall surface of said connected tube by applying a glass surface protecting substance to prevent deterioration of the glass due to the luminescent substance; and
    a step of forming a luminescent layer laminated on said protection layer on said inner wall surface of said connected tube by introducing a luminescent substance through said open ends.

10. The method according to claim 9; wherein in both said steps of forming said protection and luminescent layers, both said glass surface protecting and luminescent substances are introduced into said connected tube in the same direction through the same open ends.

11. The method according to claim 9; wherein in both said steps of forming said protection and luminescent layers, both said glass surface protecting and luminescent substances are introduced into said connected tube in opposite directions through opposite open ends.

12. The method according to claim 11; wherein said surface protecting substance is introduced into said tube via an opening portion that is not an end at which said connecting portion is formed in said step of forming said protection layer, and said luminescent substance is introduced into said tube via an opening portion on the side of said connecting portion in said step of forming said luminescent layer.

13. The method according to claim 11; wherein said surface protecting substance is introduced into said tube via an opening portion that is an end portion at which said connecting portion is formed in said step of forming said protection layer, and said luminescent substance is introduced into said tube via an opening portion that is not a side of said connecting portion in said step of forming said luminescent layer.

14. The method according to claim 11; wherein said surface protecting substance applied to an inner wall surface of said tube as said protection layer is made of metal oxide.

15. The method according to claim 14; wherein said metal oxide at least includes any one of aluminum, titanium and zinc oxide.

16. The method according to claim 14; wherein said surface protecting substance is applied to the inner wall surface by a suspension liquid including an organic solvent.

* * * * *